(12) United States Patent
Yuan et al.

(10) Patent No.: US 10,867,117 B2
(45) Date of Patent: Dec. 15, 2020

(54) OPTIMIZED DOCUMENT VIEWS FOR MOBILE DEVICE INTERFACES

(71) Applicant: MICROSOFT TECHNOLOGY LICENSING, LLC, Redmond, WA (US)

(72) Inventors: Sharlene Yuan, Taipei (TW); Jackie Chang, Taipei (TW); Buddha Wang, Taichung (TW); Esther Tsai, Taichung (TW); April Jiang, Taipei (TW); George Shih, Taipei (TW); Eric Yeh, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 14/833,083

(22) Filed: Aug. 22, 2015

(65) Prior Publication Data
US 2015/0363366 A1 Dec. 17, 2015

Related U.S. Application Data

(63) Continuation of application No. 13/524,175, filed on Jun. 15, 2012.

(51) Int. Cl.
*G06F 40/106* (2020.01)
*G06F 3/0484* (2013.01)
(Continued)

(52) U.S. Cl.
CPC .......... *G06F 40/106* (2020.01); *G06F 3/0483* (2013.01); *G06F 3/0485* (2013.01);
(Continued)

(58) Field of Classification Search
None
See application file for complete search history.

(56) References Cited

U.S. PATENT DOCUMENTS 5,812,131 A 9/1998 Bertram
5,893,125 A 4/1999 Shostak
(Continued)

OTHER PUBLICATIONS

Wikispacetuts, "How to Embed a Scribd Document in Your Wikispace", published on Aug. 19, 2009, available in Youtube.com, 0: 22-6:54 (Year: 2009).*

(Continued)

*Primary Examiner* — Ariel Mercado

(57) ABSTRACT

Portions of document contents are separated into individually controlled sections on a user interface of a smaller size client device display. A document viewed on a mobile device may include different content portions such as textual content, tables, slides and graphics. Due to a smaller user interface of the mobile device, some portions of the content may extend outside of the user interface and may not all be visible at the same time. The user may use gestures to scroll through and resize the document to view all of the contents. The system may separate each of the different content portions into individual sections and enable the user to control each section separately, such that the user may navigate, resize, and reposition each individual section without affecting the size and position of the remaining sections of the document for optimally viewing the document on the user interface.

20 Claims, 8 Drawing Sheets

(51) Int. Cl.
*G06F 3/0485* (2013.01)
*G06F 3/0488* (2013.01)
*G06F 3/0483* (2013.01)
*G06F 16/957* (2019.01)

(52) U.S. Cl.
CPC ...... *G06F 3/04842* (2013.01); *G06F 3/04845* (2013.01); *G06F 3/04847* (2013.01); *G06F 3/04883* (2013.01); *G06F 3/04886* (2013.01); *G06F 16/9577* (2019.01)

(56) References Cited

U.S. PATENT DOCUMENTS

| | | | |
|---|---|---|---|
| 2004/0075673 A1 | 4/2004 | Vale et al. | |
| 2006/0288280 A1 | 12/2006 | Makela | |
| 2007/0124669 A1* | 5/2007 | Makela | G06F 16/9577 715/201 |
| 2008/0235602 A1* | 9/2008 | Strauss | G06F 9/4443 715/762 |
| 2009/0060452 A1 | 3/2009 | Chaudhri | |
| 2009/0271283 A1* | 10/2009 | Fosnacht | G06Q 20/123 715/760 |
| 2009/0313574 A1 | 12/2009 | Shih et al. | |
| 2010/0169362 A1* | 7/2010 | Bulfani, Jr. | G06F 17/30867 715/760 |
| 2010/0174421 A1 | 7/2010 | Tsai et al. | |
| 2010/0251102 A1 | 9/2010 | Chen et al. | |
| 2010/0268773 A1 | 10/2010 | Hunt et al. | |
| 2010/0283743 A1* | 11/2010 | Coddington | G06F 3/0485 345/173 |
| 2011/0095999 A1 | 4/2011 | Hayton | |
| 2011/0167391 A1 | 7/2011 | Momeyer et al. | |
| 2011/0202829 A1* | 8/2011 | Klassen | G06F 17/30905 715/243 |
| 2011/0231782 A1 | 9/2011 | Rohrabaugh et al. | |
| 2011/0258535 A1* | 10/2011 | Adler, III | G06F 17/214 715/235 |
| 2011/0265002 A1 | 10/2011 | Hong et al. | |
| 2011/0307772 A1 | 12/2011 | Lloyd et al. | |
| 2013/0033523 A1* | 2/2013 | Stovicek | G06F 40/197 345/649 |
| 2014/0250372 A1* | 9/2014 | Slembrouck | G06F 3/0483 715/244 |
| 2017/0060857 A1* | 3/2017 | Imbruce | G06F 16/48 |

OTHER PUBLICATIONS

TechDaddyK, "How to Embed PDF files in WordPress posts", published on Apr. 30, 2010, available in Youtube.com, 2:09-2:14 (Year: 2010).*

"Final Office Action Received for U.S. Appl. No. 13/524,175", dated Nov. 5, 2015, 46 Pages.

"Non-Final Office Action Issued in U.S. Appl. No. 13/524,175", dated Dec. 14, 2016, 41 Pages.

"Non-Final Office Action Issued in U.S. Appl. No. 13/524,175", dated Oct. 3, 2014, 37 Pages.

"Final Office Action Issued in U.S. Appl. No. 13/524,175", dated Feb. 10, 2015, 42 Pages.

"Non-Final Office Action Issued in U.S. Appl. No. 13/524,175", dated Jul. 16, 2015, 45 Pages.

"Final Office Action Issued in U.S. Appl. No. 13/524,175", dated Sep. 30, 2016, 49 Pages.

"Final Office Action Issued in U.S. Appl. No. 13/524,175", dated Jun. 22, 2017, 47 Pages.

Non-Final Office Action Issued in U.S. Appl. No. 13/524,175, dated Dec. 13, 2017, 31 Pages.

"Final Office Action Issued in U.S. Appl. No. 13/524,175", dated Apr. 24, 2018, 26 Pages.

* cited by examiner

OPTIMIZED DOCUMENT VIEWS FOR MOBILE DEVICE INTERFACES

CROSS-REFERENCE TO RELATED APPLICATION

This Application is a continuation under 35 U.S.C. § 120 of co-pending U.S. patent application Ser. No. 13/524,175 filed on Jun. 15, 2012, by the same inventors, commonly assigned herewith. The disclosure of the U.S. Patent Application is hereby incorporated by reference in its entireties.

BACKGROUND

Modern communication systems may enable a user to view a document on a client device such as a mobile device, smart phone, tablet, or other personal computing device. Often times a mobile device may have a smaller user interface as compared with display screens of larger computing devices, and when the document is viewed on the smaller user interface of the mobile device, the entire contents of the document may not all be visible at the same time. Sometimes only a portion of the document may be viewed at a time, and the remaining contents may extend outside of the viewing area of the user interface.

The user may resize a portion of the document, such as a table or textual content, in order to optimally view the entire contents of a portion of the document on the user interface, and the resizing of the portion of the document may cause the entire document to be resized resulting in certain portions of the document to extend outside of the viewing window of the user interface where they are not visible and/or becoming an unreadable size.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to optimizing view of documents on relatively smaller mobile device displays. In some embodiments, a table inserted into a document such as a word processing document may be displayed in a larger size than the content around it for ease of viewability. A user may be enabled to move the table in a horizontal direction through swipe actions while the content around the table is preserved. In other embodiments, textual content of a presentation slide may be displayed along with the slide (above or below the slide) on the mobile device display. A user may be enabled to navigate the slide through a horizontal swipe action, while the textual content may be scrolled through a vertical swipe action.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
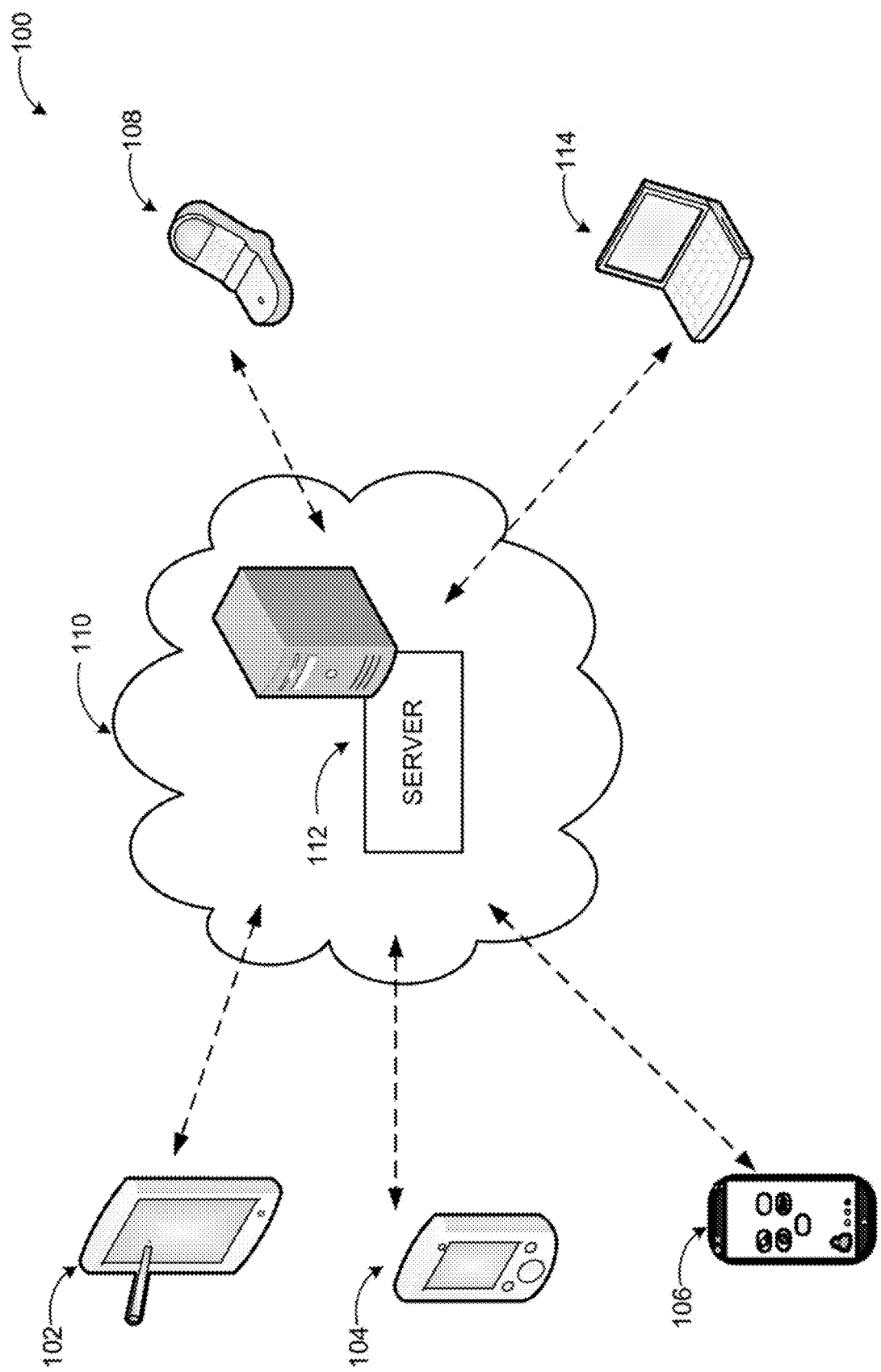
FIG. 1 illustrates an example networked environment where embodiments may be implemented.

As briefly described above, portions of document contents may be separated into individually controlled sections on a user interface of a small form client device. A table inserted into a document such as a word processing document may be displayed in a larger size than the content around it for ease of viewability. A user may be enabled to move the table in a horizontal direction through swipe actions while the content around the table is preserved. Textual content of a presentation slide may also be displayed along with the slide (above or below the slide) on the mobile device display. A user may be enabled to navigate the slide through a horizontal swipe action, while the textual content may be scrolled through a vertical swipe action.

A document may include different content portions such as textual content, tables, slides and graphics. The document size may be optimized for viewing on the smaller interface of the client device. However, the optimum viewing size of a textual content portion may not be the optimum viewing size for other content portions such as tables and slides.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Throughout this specification, the term "platform" may be a combination of software and hardware components for separating portions of document contents into individually controlled sections on a user interface. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

According to some embodiments, a gesture enabled input device and display screen may be utilized for viewing documents and receiving input from a user over a user interface. The gesture enabled input device and display screen may utilize any technology that allows touch input by a user to be recognized. For example, some technologies may include, but are not limited to: heat, finger pressure, high capture rate cameras, infrared light, optic capture, tuned electromagnetic induction, ultrasonic receivers, transducer microphones, laser rangefinders, shadow capture, and the like. The user interface of a gesture enabled device may display content and documents associated with word processing applications, presentation applications, spreadsheet applications and web page content, and menus of actions for interacting with the displayed content. A user may use touch input actions to interact with the user interface to access, view and edit the content, such as documents, tables, spreadsheets, charts, lists, and any content (e.g., audio, video, etc.). The gesture enabled input device may make use of features specific to touch or gesture enabled computing devices, but may also work with a traditional mouse and keyboard. A touch input action, such as a tap or swipe action as used herein may be provided by a user through a finger, a pen, a mouse, or similar device, as well as through predefined keyboard entry combinations, eye-tracking, and/or a voice command.

FIG. 1 illustrates an example networked environment where embodiments may be implemented. In an example networked environment, a user may utilize one or more devices, such as mobile devices 108, smart phones 104, 106, tablets 102, and other personal computing devices 114 to view documents, applications and web pages over the network. The devices such as smart phones 106 and mobile devices 108 may have small memory capacity and low processing or CPU speed compared with larger computing devices, and may operate in conjunction with a remote server over a cloud 110 for retrieving the data associated with a document viewed on the device. For example, a remote server 112 residing in the cloud 110 may store, maintain, and manage application data for applications and documents executed on the client device, and through a browser executed on the client device, the client device may connect to the cloud for retrieving requested application data and loading the data onto the client device. The client device may connect to the server 112 on the cloud 110 via a networked environment, which may be a wireless or wired network as some examples, and likewise the application data may be delivered from the server 112 residing on the cloud 110 to the client device via the networked environment.

When a user opens an application, document, and/or web application on the client device, such as a mobile device 108, tablet 102, and/or smartphone 104, 106, for example, the client device may retrieve the data over the network from the server 112 residing in the cloud 110. The retrieved data may be retrieved and formatted for display on the client device in a format especially optimized for the size of the user interface of the client device. Often times the client device, including a mobile device 108, tablet 102, and/or smartphone 104, 106 may have a smaller user interface as compared with display screens of larger computing devices. When a document is viewed on the smaller user interface of the client device, the entire contents of the document may not all be visible at the same time. Sometimes only a portion of the document may be viewed at a time, and the remaining contents may extend outside of the viewing area of the user interface. The user may need to scroll through the document in order to navigate through the entire contents of the document.

In an example embodiment, on a gesture enabled device, a user may use a touch action or an optically captured gesture such as a tap, drag, and/or swipe to scroll through the document and navigate to subsequent pages and portions of the document. The user may also use pinching and expanding touch actions to zoom in and out of the document and resize the document as it is displayed on the user interface. Additionally, a document may include additional elements and content portions along with textual content, such as tables, graphics, slides, and embedded audio/visual files. In an example scenario, the user may resize a portion of the document, such as a table, in order to optimally view the selected portion, and the resizing of the portion may cause the entire document to be resized resulting in certain portions of the document may extending outside of the viewing window of the user interface and becoming unreadable.

Often times, the optimal size of the textual content for viewing on the user interface of the client device may not be an optimal size for viewing the additional elements, such as embedded tables, graphics, slides, and audio/visual files. For example, when the textual content is magnified to an optimal viewing size, a table included in the document may be magnified as well, such that the portions of the table extend outside of the user interface and are not viewable on the user interface. If the user resizes the table to make the entire table visible on the user interface, then the textual content of the document may be resized to an unreadable size. In another example, when a user views a slide show presentation on the client device, the user may optimize the size of slide for viewing on the user interface, causing textual content associated with the slide such as accompanying notes, not to be optimally visible on the user interface. The user may have to continually resize portions of the document, and pan and scroll through the document in order to effectively view all of the contents of the document.

Figure 2:
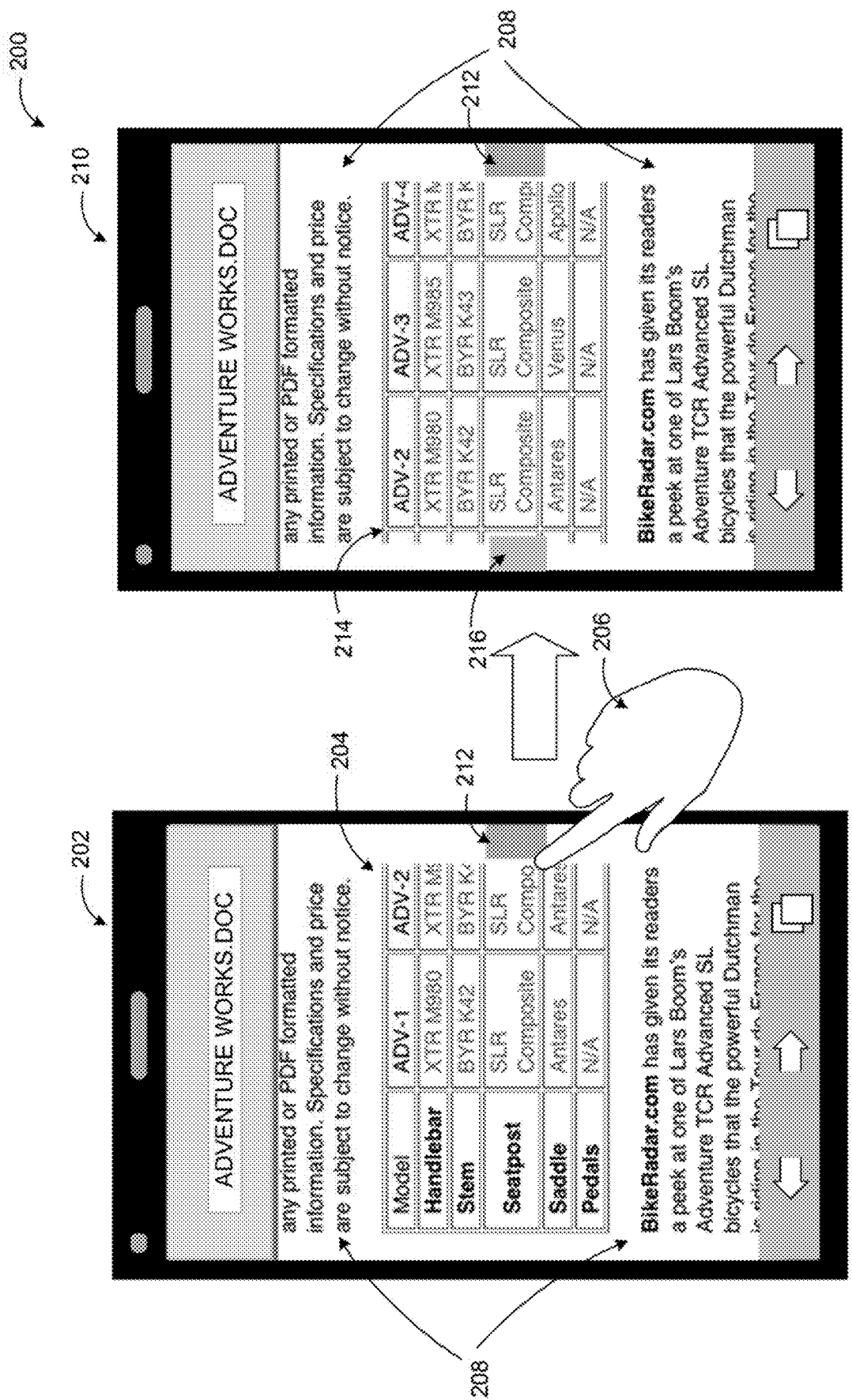
FIG. 2 illustrates an example user interface for optimally displaying textual and other content on a gesture enabled device, according to embodiments.

FIG. 2 illustrates an example user interface for optimally displaying textual and other content on a gesture enabled device, according to embodiments. A document may be viewed on the user interface 202 of a client device such as a mobile device, smart phone and/or tablet. The document may contain textual content 208 as well as other embedded content such as tables, graphics, slides, and audio/visual files. Often times when the document is viewed on the device, the document size and format may be optimized for viewing within the size constraints of the user interface 202 of the device. As demonstrated in diagram 200, when the size of the document is resized to optimize the display of the textual content 208 on the user interface 202, a table 204 included within the document may be larger than the size of the user interface 202 and may extend outside of the visible size constraints of the user interface 202.

A system according to embodiments may enable the textual content 208 to be separated from other content portions included within the document, such as the table 204, such that each portion of the document as viewed on the user interface 202 may be separately controlled by a user. For example, the user may be able to navigate through the textual content 208 without affecting the table 204, and may additionally be able to navigate and scroll through the table 204 without affecting the textual content 208. When the document is viewed on the user interface with a portion of the table 204 extending outside of the size constraints of the user interface 202, an indicator 212 may be provided for indicating to the user that additional portions of content may be available in the direction of the indicator 212 and prompting the user to scroll through the table 204 to view the additional content.

In an example embodiment, the user interface 202 may be gesture enabled, such that the user may use a touch action 206 to navigate through portions of the document viewed on the user interface 202 of the client device. When the document is viewed on the user interface 202 with a portion of the table 204 overflowing or extending outside of the size constraints of the user interface 202, the user may use a touch action 206 such as a swipe or drag in the direction of the indicator 212 to navigate to the portions of the table 204 not currently visible. For example, the user may swipe from left to right to display the overflowing table content. Additionally, the user may use a touch action 206, such as a tap on the indicator 212 to navigate to additional portions of the document not currently visible.

As demonstrated in diagram 200, the user may realize that as the document is currently viewed on the user interface 202, a portion of the table 204 may extend outside of the size constraints of the user interface 202. The user may execute a touch action 206, such as a horizontal swipe in the direction of the indicator 212, to scroll through the table 204 in order to display the remaining portions of the table 204 on the user interface. When the user executes the swipe action on the table 204, the user interface 210 may scroll through the table 204 and may display portions 214 of the table that were not displayed in the original user interface 202. While the user scrolls through the table 204, the textual content 208 that is not a part of the table 204 may remain fixed within the user interface 202, such that the size and position of the textual content 208 may remain unchanged. Likewise, the user may independently navigate and control textual content 208 using touch actions on the user interface, and while the textual content 208 may be scrolled and resized, the table 204 portion of the document may remain fixed within the user interface 202, such that the size and position of the table 204 may remain unchanged.

In some examples, a single indicator may be used, left or right depending on a language of the system, without prompting the user to navigate in a particular direction. In additional embodiments, when the user scrolls through the table 204 to display portions 214 of the table that were not originally visible, an additional indicator 216 may be provided in order to indicate that there may be additional portions of the table in another direction which may not be visible on the user interface 212. For example the additional indicator 216 may indicate that there are portions of the table 204 available to the left of the table as currently viewed, while the indicator 212 on the right may indicate additional portions available to the right. In another embodiment, if portions of the table are available above and/or below the currently viewed table, then indicators may be provided above and below the currently viewed table prompting the user to scroll up and down with vertical touch actions, as well as horizontally to the left and to the right.

In a further embodiment, the user may be able to add formatting to each content portion individually without affecting the formatting of the other content portions of the document. For example, the user may format the table to be right aligned while the other content is left aligned. The user may also be enabled to swipe from right to left (or left to right) in order to read the portions of the table that extend outside of the user interface without affecting the format of the textual content above and below the table.

Figure 3:
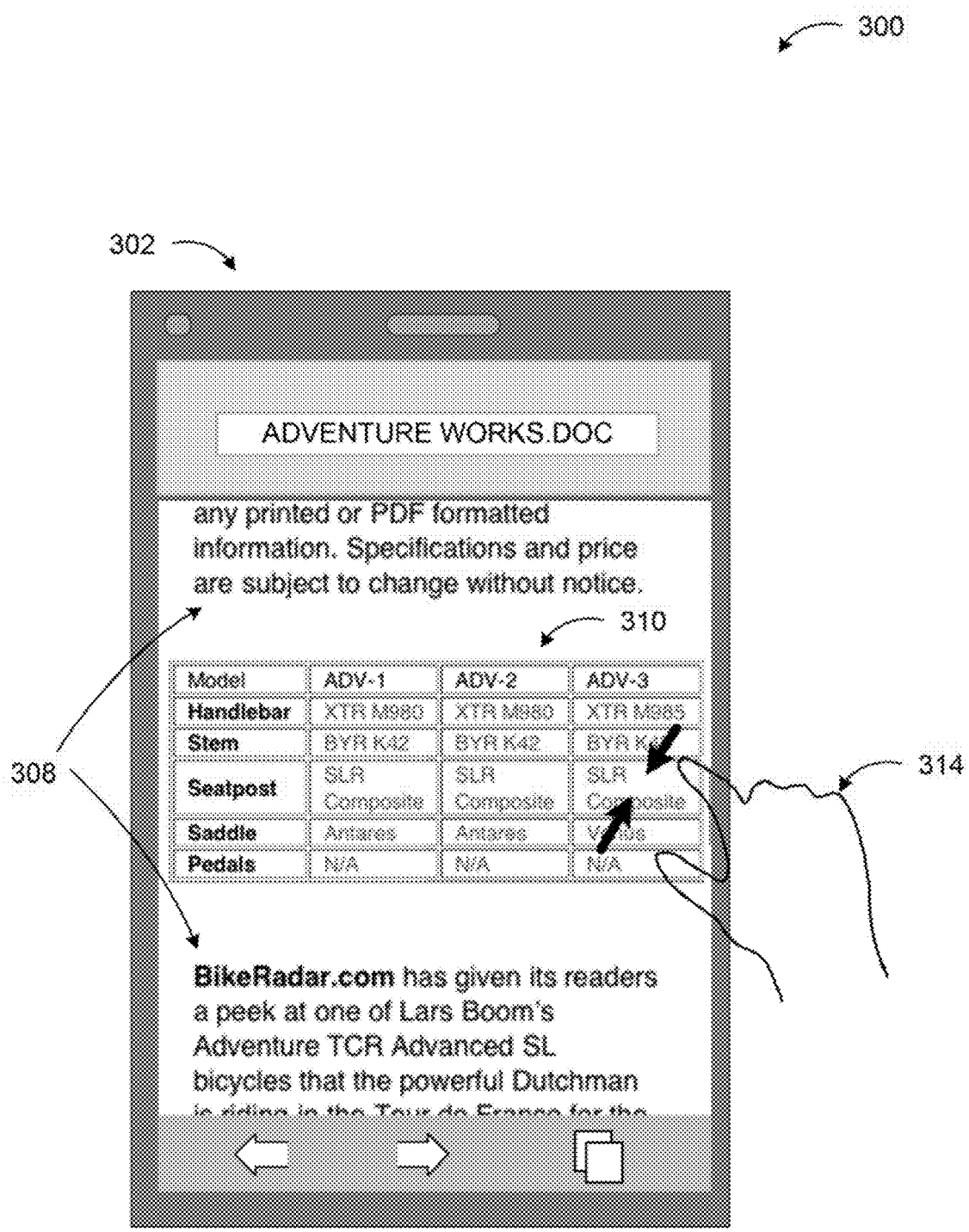
FIG. 3 illustrates an example user interface for individually resizing portions of content on a gesture enabled device, according to embodiments.

FIG. 3 illustrates an example user interface for individually resizing portions of content on a gesture enabled device, according to embodiments. As previously discussed in conjunction with FIG. 2, a system according to embodiments may enable different content portions of a document viewed on a user interface 302 of a client device to be separately controlled on the user interface 302. For example, on a gesture enabled device, a user may use touch actions to navigate through textual content portions 308 of the document without affecting the size and position of other portions of the document. Additionally, the user may scroll, pan, resize, and reformat a table 310 embedded within the document without affecting the size, position, and formatting of the textual content 308 of the document.

In an example embodiment, on a gesture enabled device, if the table 310 is originally displayed such that portions of the table may overflow or extend outside the viewing area of the user interface 302 of the document, the user may resize the table 310 in order to view the entire table 310 within the user interface 302. The user may use expanding and pinching 314 touch actions to zoom in and out of the document table to magnify and reduce the size of the table 314 as it is displayed on the user interface. As the user magnifies resized the table 310 to optimally view the table 310 within the user interface 302 of the client device, the textual content portions 308 may remain separate such that the resizing action on the table 310 does not operate to resize the textual content portions 308. The textual content portions 308 that are not a part of the table 310 may remain fixed within the user interface 302, such that the size and position of the textual content portions 308 may remain unchanged.

Figure 4:
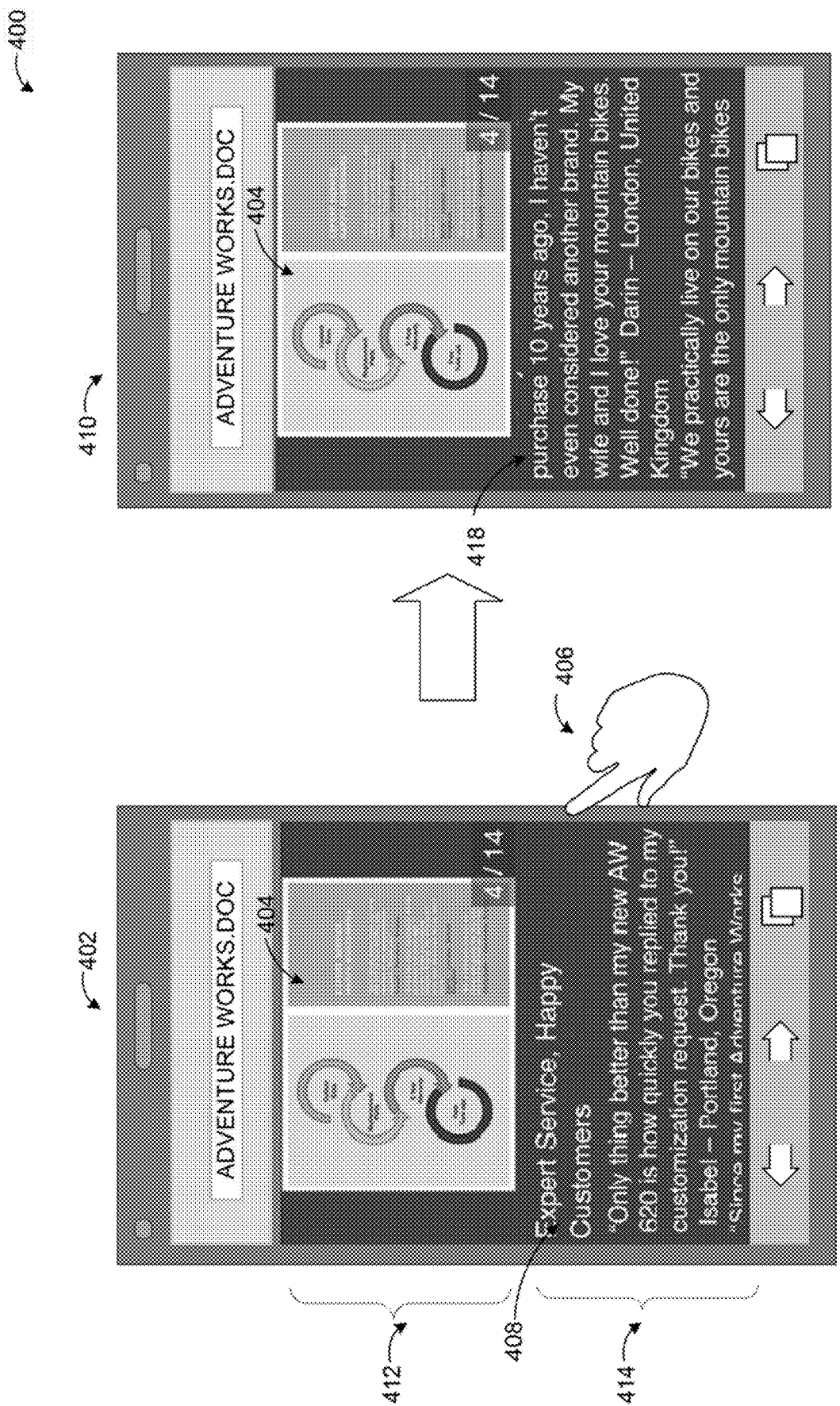
FIG. 4 illustrates an example slide show presentation with accompanying textual content viewed on a user interface, according to embodiments.

FIG. 4 illustrates an example slide show presentation with accompanying textual content viewed on a user interface, according to embodiments. As previously described, a user interface 402 on a client device may enable a user to view a document, such as a slide show presentation, on the client device. Due to the smaller size of some client device user interfaces, all of the contents of the document may not be displayed simultaneously, and the user may need to navigate through and resize portions of the document in order to optimally read and view the document.

In a system according to embodiments, when a slide show presentation is viewed on the client device, a slide image 404 may be displayed on the user interface 402, and the device may also request the data for the textual content 408 of the slide for displaying along with the slide image 404 on the user interface 402. The slide image 404 and the textual content 408 may be separated such that they may each be independently controlled and navigated by the user on the user interface. In an example embodiment, the slide image 404 and the textual content 408 may be displayed as a split screen on the user interface 402 such that the slide image split screen 412 and the textual content split screen 414 may be independent from each other and separately controlled by a user. The split screen may be positioned side by side and/or top and bottom depending on an orientation and size of the user interface 402 of the client device.

In an example embodiment, the user may use touch actions such as a swipe, tap or drag on each split screen to control the content contained within the split screen. For example, the user may zoom in/out, resize, and pan the slide image 402 within slide image split screen 412 without affecting the size and position of the textual content 408 within the textual content split screen 414. Additionally, the user interface may be configured to enable the user to swipe in a horizontal direction on the slide image split screen 412 for navigating to a new slide of the slide show presentation. When the user navigates to a new slide of the slide show presentation, the new slide image may be displayed on the slide show split screen 412, and the client device may retrieve the accompanying textual content for the new slide and may update and display the new slide accompanying textual content in the textual content split screen 414.

In an additional embodiment, when the slide image 404 is viewed in the slide image split screen 412, and the textual content 408 may be displayed in the textual content split screen 414, all of the textual content 408 may not be viewable within the textual content split screen 414. The user may perform a touch action 406 to scroll through the textual content 408 and to navigate to the portions of the textual content 408 which extend outside of the viewable area of the textual content touch screen 414. In an example scenario, the textual content 408 may overflow over the edge of the textual content touch screen 414 indicating to the user that there is additional textual content 418 and prompting the user to swipe further down to read through the textual content. The user may perform a swipe action on the textual content touch screen 414 in a vertical direction to display the overflowing additional textual content 418 within the textual content touch screen 414. The user may also use a drag action to pan the textual content 408 in any direction in which the text may overflow. The slide image 404 may remain fixed in the slide image split screen 412 while the user scrolls through the accompanying text within the textual content touch screen 414. Additionally the user interface 402 may provide an indicator for prompting the user to navigate to the additional textual content 418.

Figure 5:
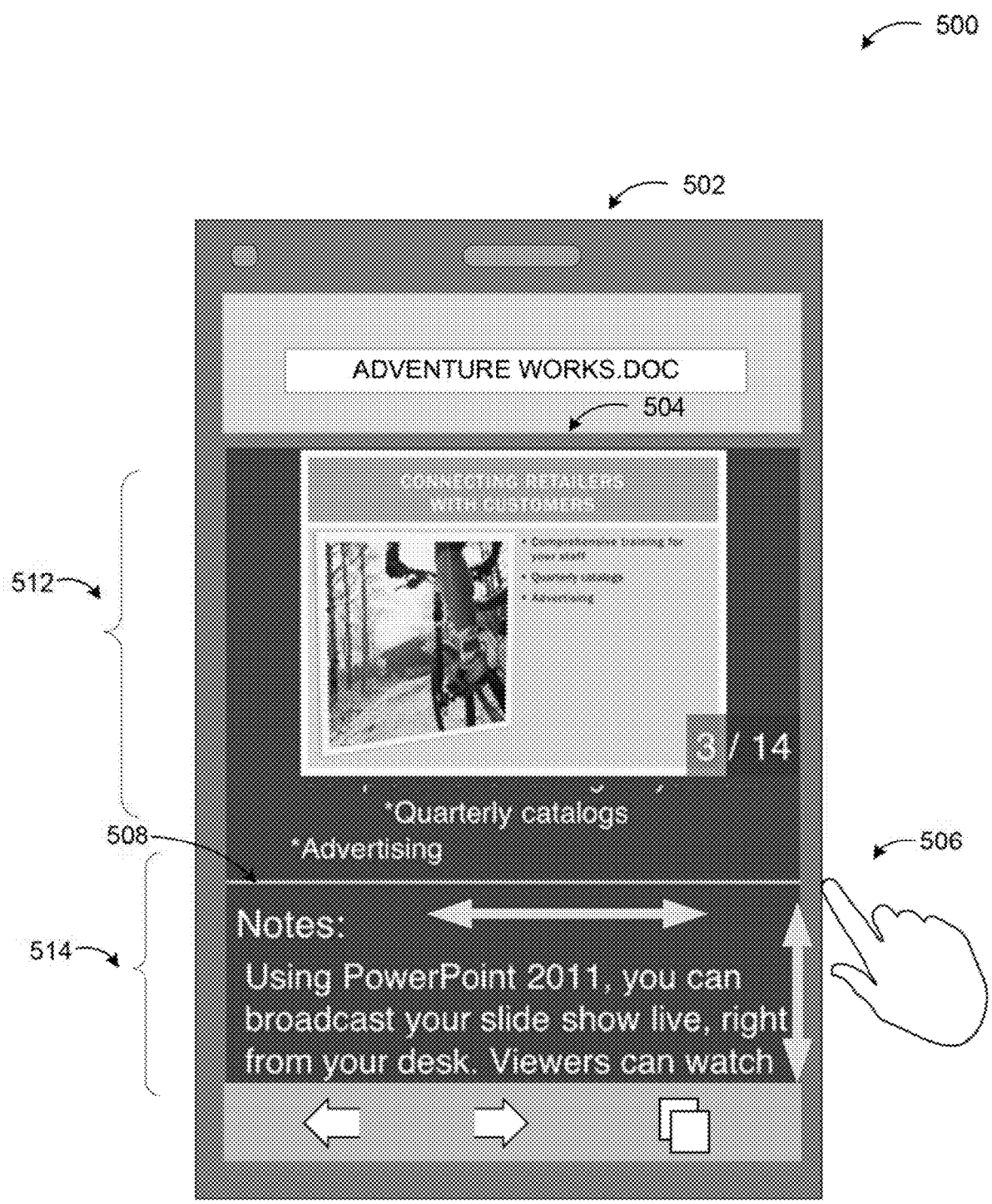
FIG. 5 illustrates an example split screen displaying a slide image and accompanying notes on a user interface, according to embodiments.

FIG. 5 illustrates an example split screen displaying a slide image and accompanying notes on a user interface, according to embodiments. In an example embodiment, a slide show presentation may be displayed on a user interface of a client device, and a slide image 504 may be displayed on the user interface 502 as well as textual content and additional notes 508 which may accompany the slide image 504. The slideshow presentation may be displayed as a split screen on the user interface 502 such that the slide image split screen 512 and the textual content split screen 514 may be independent from each other and separately controlled by a user.

In an example embodiment, the user may perform a touch action 506, such as a swipe, in a horizontal direction on the slide image split screen 512 for navigating to a new slide within the slide show presentation. Additionally the user may perform pinching, expanding and panning actions to resize and reposition the slide image 504 within the slide image split screen 512. While the user may resize and reposition the slide image 504 within the slide image split screen 512, the size and position of the textual content and the notes 508 included within the textual content split screen 514 may remain unchanged.

When the slide image 504 is viewed in the slide image split screen 512, the textual content that is contained within the slide image 504 may be initially displayed in the textual content split screen 514. As previously discussed, the user may swipe the textual content split screen 514 in a vertical direction to display overflowing textual content.

In a further embodiment, if notes 508 accompany the slide image 504, the user may perform a touch action, such as a swipe, in a horizontal direction on the textual content split screen 514 to cause the notes 508 to be displayed. All of the content of the notes 508 may not be viewable within the textual content split screen 514, and the user may also perform a touch action 506 within the textual content split screen 514 to navigate to the portions of the notes 508 which extend outside of the viewable area of the textual content touch screen 514. In an example scenario, the text of the notes 508 may overflow over the edge of the textual content touch screen 514 indicating to the user that there is additional textual content 518 and prompting the user to swipe further down to read through the textual content. The user may perform a swipe action in a vertical direction to display the overflowing notes 508 within the textual content touch screen 514, and may additionally perform a drag action to pan the notes 508 in any direction. Additionally the user may perform pinching and expanding actions to resize the textual content and notes included within the textual content split screen 514 to optimize the display of the textual content and notes. While the user navigates through the textual content and the notes 508 included within the textual content split screen 514, the slide number, and size and position of the slide image may remain unchanged.

The example user interface elements and interactions discussed in FIG. 1 through FIG. 5 are for illustration purposes only and do not constitute a limitation on embodiments. A system for separating portions of document contents into individually controlled sections on a user interface may be implemented with other user interfaces, interface elements, presentations, and configurations using the principles described herein.

Figure 6:
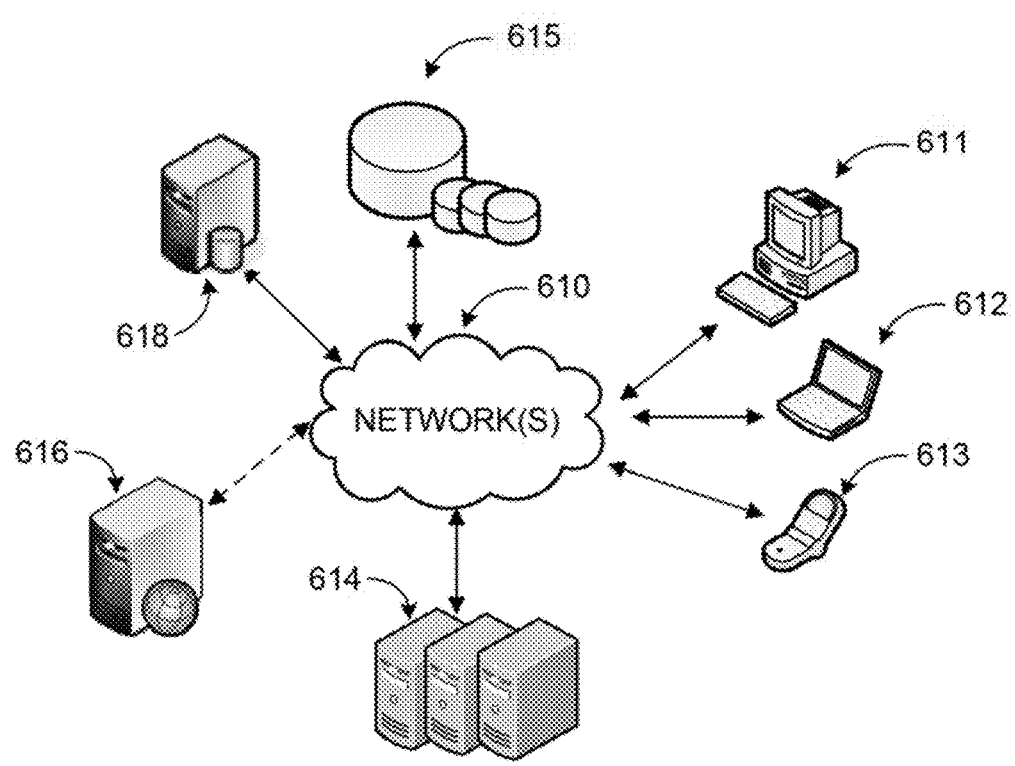
FIG. 6 is a networked environment, where a system according to embodiments may be implemented.

FIG. 6 is an example networked environment, where embodiments may be implemented. A system for separating portions of document contents into individually controlled sections on a user interface of a client device may be implemented via software executed over one or more servers 614 such as a hosted service. The platform may communicate with client applications on individual computing devices such as a smart phone 613, a laptop computer 612, or desktop computer 611 ('client devices') through network(s) 610.

Client applications executed on any of the client devices 611-613 may facilitate communications via application(s) executed by servers 614, or on individual server 614. An application executed on one of the servers may facilitate separating portions of document contents into individually controlled sections on a user interface of a client device. The application may retrieve relevant data from data store(s) 615 directly or through database server 618, and provide requested services (e.g. document editing) to the user(s) through client devices 611-613.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a platform for separating portions of document contents into individually controlled sections on a user interface of a client device. Furthermore, the networked environments discussed in FIG. 6 are for illustration purposes only. Embodiments are not limited to the example applications, modules, or processes.

Figure 7:
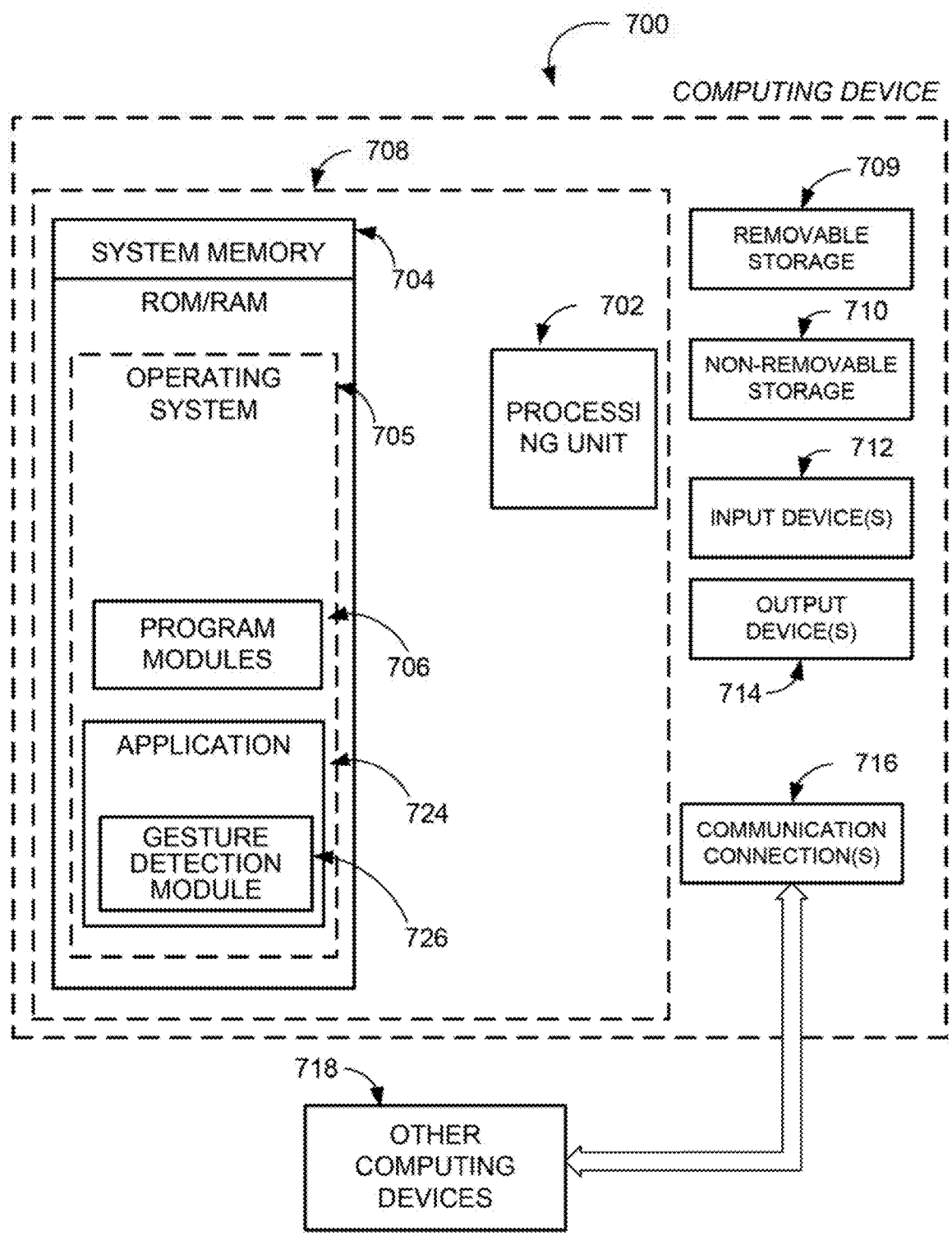
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be any computing device executing an application for of separating portions of document contents into individually controlled sections on a user interface of a client device according to embodiments and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as an application 724 and gesture detection module 726.

The application 724 may facilitate recognizing separate content portions of a document that is viewed on a gesture enabled client device such as a smart phone, mobile device, and/or tablet and separating the content portions into individually controlled portions on the client device. The application 724 may enable a computing device 700 to detect a document that is viewed on the user interface of a client device such as a smart phone, and to identify different content portions of the document, such as textual content, tables, graphics, slide images, and audio/visual files. The application 724 may facilitate separating each content portion so that each content portion can be separately and individually controlled by a user without affecting the other content portions. Through the gesture detection module 726, application 724 may detect a touch action on a select content portion of the document on the user interface of the client device. The gesture detection module 726 may enable the user to resize, reposition, reformat and scroll through the selected content portion without affecting the size and position of the rest of the document. The application 724 and gesture detection module 726 may be separate applications or integrated modules of a hosted service. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, web servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
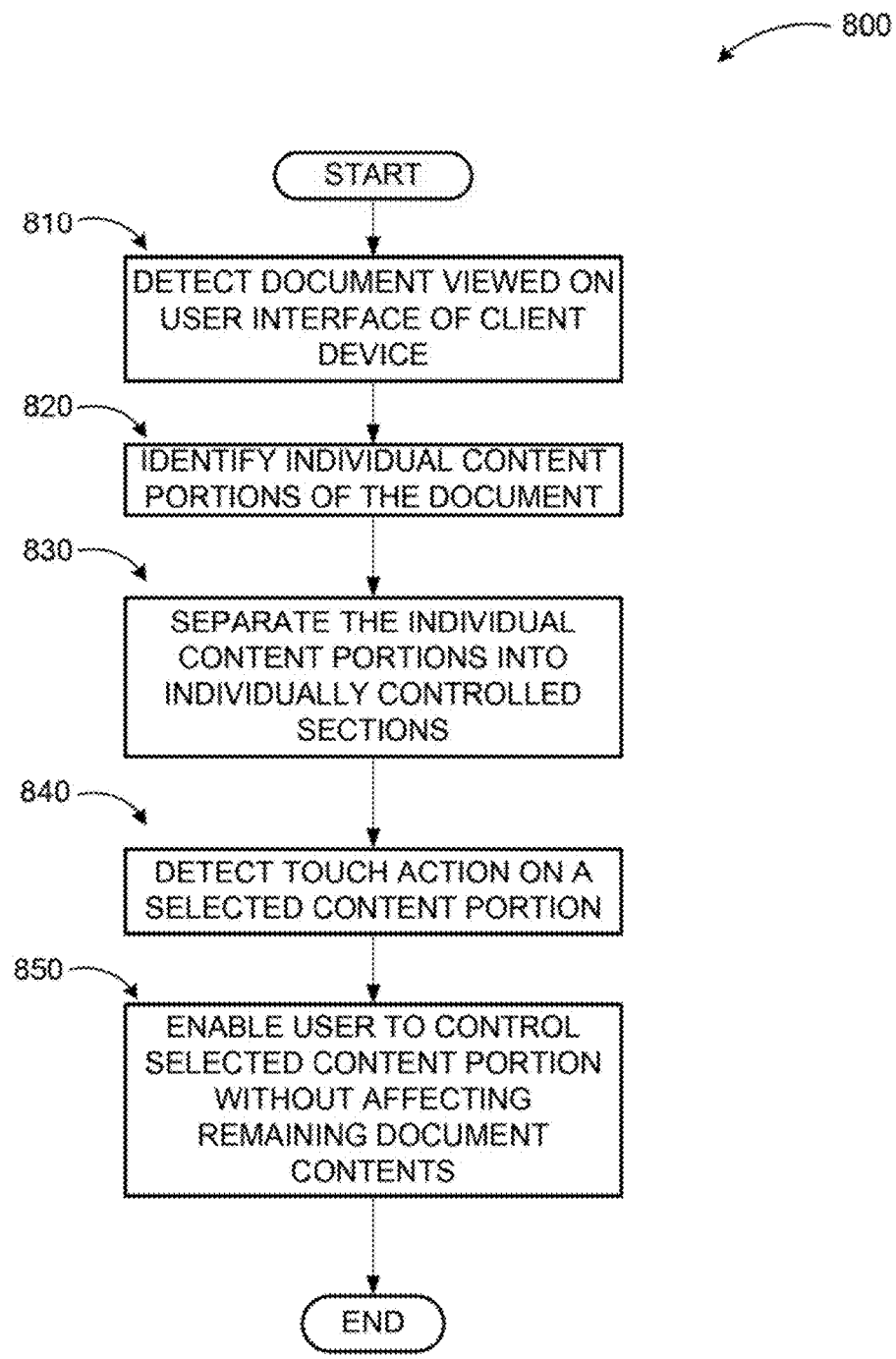
FIG. 8 illustrates a logic flow diagram for a process of separating portions of document contents into individually controlled sections on a user interface of a client device, according to embodiments.

FIG. 8 illustrates a logic flow diagram for a process of separating portions of document contents into individually controlled sections on a user interface of a client device, according to embodiments. Process 800 may be implemented on a computing device or similar electronic device capable of executing instructions through a processor.

Process 800 begins with operation 810, where the system may detect a document viewed on the user interface of the client device. In an example embodiment, the client device may be a mobile device, smart phone, and/or tablet having a restricted size user interface. At operation 820, the system may identify different individual content portions of the document viewed on the client device. The individual content portions may include textual content, tables, graphics, slides, and embedded audio/visual files. At operation 830, the system may separate each of the individual content portions into individually controlled sections. The system may separate the sections via coding behind the document, and additionally the system may separate the sections visually by providing a split screen, which may be side by side and/or top and bottom. Each section of content may be independent from the other content portions such that they may be navigated and controlled by a user without affecting other content portions.

At operation 840, the system may detect a touch action (or comparable input such as optically captured gesture, pen input, voice input, eye-tracking, etc.) on a selected content portion. A touch action may include a tap, swipe, pinch, expand, and/or drag on the content included within the selected content portion in order to scroll, resize, and reposition the selected content portion. At operation 850, the system may enable the user to control the selected content portion without affecting the remaining content portions of the document. While the user uses touch actions to scroll, resize, and reposition the selected content portion, the remaining content portions may remain fixed within the user interface of the client device, such that the size and position of the remaining content portions do not change and are not affected by the user's actions on the selected content portion.

The operations included in process 800 are for illustration purposes. Separating portions of document contents into individually controlled sections on a user interface of a client device may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method comprising:
displaying a presentation document on a user interface of a client device, wherein the presentation document comprises a generated content page that comprises a slide content portion, a textual portion and a scrollbar for the content page;
receiving a user-initiated action that comprises a touch input directly on the slide content portion that causes display of content of the slide content portion to extend outside size constraints of the user interface, wherein the user-initiated action is selected from one or more of: a navigation action, a magnification action, and a reduction action; and
providing, when the slide content portion is extending outside size constraints of the user interface in response to receipt of the user-initiated action, an indicator that is specific to the slide content portion and separate from the scrollbar of the content page, wherein the indicator indicates that additional content portions associated with the slide content portion are available for viewing in one or more directions of the indicator while preserving a size and a position of the textual portion of the presentation document.

2. The method of claim 1, further comprising: receiving a touch input, directly selecting the slide content portion, that reduces a size of the slide content portion within the size constraints of the user interface; and removing the indicator from display based on a processing of the received touch input that reduces the size of the slide content portion within the size constraints of the user interface.

3. The method of claim 1, wherein the providing comprises launching the indicator at a position, within the document, that aligns with the slide content portion based on a receipt of the user-initiated action.

4. The method of claim 1, further comprising: receiving a selection associated with the indicator and adjusting display of the slide content portion based on the selection of the indicator while preserving a size and a position of the textual portion of the presentation document.

5. The method of claim 1, wherein the indicator comprises a plurality of arrow indicators overlaying the slide content portion in the user interface, and wherein the plurality of arrow indicators comprise a first grouping of one or more arrows that visually indicate that scrolling of the slide content portion is available in a horizontal direction and a second grouping of one or more arrows, separate from the first grouping of one or more arrows, that indicate that that scrolling of the slide content portion is available in a vertical direction.

6. The method of claim 1, wherein the presentation document presents a split screen view that comprises the slide content portion on a first segmented portion of the user interface and the textual portion on a second segmented portion of the user interface, and wherein the indicator indicates that the additional content portions associated with the slide content portion are viewing in a first direction that is different from a second direction provided for a textual visual indicator specific to the textual portion when a second touch input is received on the textual portion.

7. The method of claim 6, further comprising: receiving the second touch input directly on the textual portion; and in response to a receipt of the second touch input, providing, in the user interface, the textual visual indicator in the second direction.

8. A system comprising:
a memory storing computer-executable instructions; and
at least one processor, connected with the memory, wherein the at least one processor executes the computer-executable instructions causing the at least one processor to perform a method that comprises:

displaying a presentation document on a user interface of a client device, wherein the presentation document comprises a generated content page that comprises a slide content portion, a textual portion and a scrollbar for the content page;

receiving a user-initiated action that comprises a touch input directly on the slide content portion that causes display of content of the slide content portion to extend outside size constraints of the user interface, wherein the user-initiated action is selected from one or more of: a navigation action, a magnification action, and a reduction action; and providing, when the slide content portion is extending outside size constraints of the user interface in response to receipt of the user-initiated action, an indicator that is specific to the slide content portion and separate from the scrollbar of the content page, wherein the indicator indicates that additional content portions associated with the slide content portion are available for viewing in one or more directions of the indicator while preserving a size and a position of the textual portion of the presentation document.

9. The system of claim 8, wherein the performed method further comprises: receiving a touch input, directly selecting the slide content portion, that reduces a size of the slide content portion within the size constraints of the user interface; and removing the indicator from display based on a processing of the received touch input that reduces the size of the slide content portion within the size constraints of the user interface.

10. The system of claim 8, wherein the providing comprises launching the indicator at a position, within the document, that aligns with the slide content portion based on a receipt of the user-initiated action.

11. The system of claim 8, wherein the performed method further comprises: receiving a selection associated with the indicator and adjusting display of the slide content portion based on the selection of the indicator while preserving a size and a position of the textual portion of the presentation document.

12. The system of claim 8, wherein the indicator comprises a plurality of arrow indicators overlaying the slide content portion in the user interface, and wherein the plurality of arrow indicators comprise a first grouping of one or more arrows that visually indicate that scrolling of the slide content portion is available in a horizontal direction and a second grouping of one or more arrows, separate from the first grouping of one or more arrows, that indicate that scrolling of the slide content portion is available in a vertical direction.

13. The system of claim 8, wherein the presentation document presents a split screen view that comprises the slide content portion on a first segmented portion of the user interface and the textual portion on a second segmented portion of the user interface, and wherein the indicator indicates that the additional content portions associated with the slide content portion are viewing in a first direction that is different from a second direction provided for a textual visual indicator specific to the textual portion when a second touch input is received on the textual portion.

14. The system of claim 13, wherein the method, executed by the at least one processor, further comprises: receiving the second touch input directly on the textual portion; and in response to a receipt of the second touch input, providing, in the user interface, the textual visual indicator in the second direction.

15. A hardware storage device storing computer executable instructions that, when executed by a processor, causes the processor to execute a method comprising:

displaying a presentation document on a user interface of a client device, wherein the presentation document comprises a generated content page that comprises a slide content portion, a textual portion and a scrollbar for the content page;

receiving a user-initiated action that comprises a touch input directly on the slide content portion that causes display of content of the slide content portion to extend outside size constraints of the user interface, wherein the user-initiated action is selected from one or more of: a navigation action, a magnification action, and a reduction action; and providing, when the slide content portion is extending outside size constraints of the user interface in response to receipt of the user-initiated action, an indicator that is specific to the slide content portion and separate from the scrollbar of the content page, wherein the indicator indicates that additional content portions associated with the slide content portion are available for viewing in one or more directions of the indicator while preserving a size and a position of the textual portion of the presentation document.

16. The hardware storage device of claim 15, wherein the executed method further comprising: receiving a touch input, directly selecting the slide content portion, that reduces a size of the slide content portion within the size constraints of the user interface; and removing the indicator from display based on a processing of the received touch input that reduces the size of the slide content portion within the size constraints of the user interface.

17. The hardware storage device of claim 15, wherein the providing comprises launching the indicator at a position, within the document, that aligns with the slide content portion based on a receipt of the user-initiated action.

18. The hardware storage device of claim 15, wherein the indicator comprises a plurality of arrow indicators overlaying the slide content portion in the user interface, and wherein the plurality of arrow indicators comprise a first grouping of one or more arrows that visually indicate that scrolling of the slide content portion is available in a horizontal direction and a second grouping of one or more arrows, separate from the first grouping of one or more arrows, that indicate that that scrolling of the slide content portion is available in a vertical direction.

19. The hardware storage device of claim 15, wherein the presentation document presents a split screen view that comprises the slide content portion on a first segmented portion of the user interface and the textual portion on a second segmented portion of the user interface, and wherein the indicator indicates that the additional content portions associated with the slide content portion are viewing in a first direction that is different from a second direction provided for a textual visual indicator specific to the textual portion when a second touch input is received on the textual portion.

20. The hardware storage device of claim 19, wherein the method, executed by the at least one processor, further comprising: receiving the second touch input directly on the textual portion; and in response to a receipt of the second touch input, providing, in the user interface, the textual visual indicator in the second direction.

* * * * *